United States Patent
Varnavas et al.

(10) Patent No.: US 11,303,550 B2
(45) Date of Patent: Apr. 12, 2022

(54) DETERMINING SERVER UTILIZATION USING UPPER BOUND VALUES

(71) Applicant: Citrix Systems, Inc., Fort Lauderdale, FL (US)

(72) Inventors: Andreas Varnavas, Patras (GR); Satyendra Tiwari, San Jose, CA (US); Manikam Muthiah, Banglore (IN); Nikolaos Georgakopoulos, Patras (GR)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/002,048

(22) Filed: Aug. 25, 2020

(65) Prior Publication Data

US 2022/0029901 A1 Jan. 27, 2022

Related U.S. Application Data

(63) Continuation of application No. PCT/GR2020/000037, filed on Jul. 22, 2020.

(51) Int. Cl.
  *H04L 12/26* (2006.01)
  *H04L 43/0817* (2022.01)
  *H04L 43/067* (2022.01)
  *H04L 43/065* (2022.01)

(52) U.S. Cl.
  CPC ........ *H04L 43/0817* (2013.01); *H04L 43/065* (2013.01); *H04L 43/067* (2013.01)

(58) Field of Classification Search
  CPC .. H04L 43/0817; H04L 43/067; H04L 43/065
  See application file for complete search history.

(56) References Cited

U.S. PATENT DOCUMENTS

| | | | | |
|---|---|---|---|---|
| 5,379,393 A | * | 1/1995 | Yang | G06F 12/0875 711/3 |
| 6,460,082 B1 | * | 10/2002 | Lumelsky | G06F 9/50 709/226 |
| 7,254,750 B1 | * | 8/2007 | Okun | G06F 11/3452 714/47.2 |

(Continued)

FOREIGN PATENT DOCUMENTS

EP  2 698 712 A2  2/2014

OTHER PUBLICATIONS

International Search Report and Written Opinion on PCT Appl. No. PCT/GR2020/000037 dated Mar. 31, 2021.

*Primary Examiner* — Backhean Tiv
(74) *Attorney, Agent, or Firm* — Foley & Lardner LLP

(57) ABSTRACT

Described embodiments provide systems and methods for monitoring server utilization and reallocating resources using upper bound values. A device can determine a value indicative of an upper bound of a processing load of a server using data points detected for the processing load over a first range of time. The upper bound can correspond to a percentage of the processing load during the first range of time. The device can monitor, using the value, the processing load of the server over a second range of time. A determination can be made whether the value of the processing load is greater than a threshold during the second range of time. The device can generate an alert for the device responsive to a comparison of the value of the processing load to the threshold.

20 Claims, 5 Drawing Sheets

(56) References Cited

U.S. PATENT DOCUMENTS

| | | | | |
|---|---|---|---|---|
| 7,383,548 B2* | 6/2008 | Boon | G06F 9/4881 | |
| | | | 718/100 | |
| 7,882,230 B2* | 2/2011 | Appleby | H04L 67/101 | |
| | | | 709/226 | |
| 8,484,643 B2* | 7/2013 | Takatsu | G06F 11/3423 | |
| | | | 718/101 | |
| 10,069,757 B1* | 9/2018 | Young | H04L 41/0896 | |
| 10,574,584 B1* | 2/2020 | Young | H04L 41/0823 | |
| 2005/0155032 A1* | 7/2005 | Schantz | G06F 9/5083 | |
| | | | 718/100 | |
| 2006/0123217 A1* | 6/2006 | Burdick | G06F 9/5077 | |
| | | | 711/173 | |
| 2007/0073709 A1* | 3/2007 | Lim | G06F 1/3203 | |
| 2007/0282567 A1* | 12/2007 | Dawson | G06F 11/3495 | |
| | | | 702/186 | |
| 2008/0154837 A1* | 6/2008 | Morimura | G06F 11/3476 | |
| | | | 706/48 | |
| 2009/0154366 A1* | 6/2009 | Rossi | H04L 43/10 | |
| | | | 370/252 | |
| 2009/0240366 A1* | 9/2009 | Kaushal | G06N 5/04 | |
| | | | 700/110 | |
| 2010/0251251 A1* | 9/2010 | Lee | G06F 9/5027 | |
| | | | 718/103 | |
| 2010/0313270 A1* | 12/2010 | Kim | G06F 21/552 | |
| | | | 726/24 | |
| 2011/0087924 A1* | 4/2011 | Kandula | G06F 11/0709 | |
| | | | 714/26 | |
| 2011/0161696 A1* | 6/2011 | Fletcher | G06F 1/3203 | |
| | | | 713/320 | |
| 2012/0023493 A1* | 1/2012 | Mori | G06F 9/45558 | |
| | | | 718/1 | |
| 2012/0144008 A1* | 6/2012 | Yuyitung | G06F 9/5066 | |
| | | | 709/223 | |
| 2012/0204176 A1* | 8/2012 | Tian | G06F 9/505 | |
| | | | 718/1 | |
| 2013/0117275 A1* | 5/2013 | Yoshida | G06F 11/3409 | |
| | | | 707/741 | |
| 2013/0263117 A1* | 10/2013 | Konik | G06F 9/5077 | |
| | | | 718/1 | |
| 2014/0365643 A1* | 12/2014 | Sample | G06F 11/3495 | |
| | | | 709/224 | |
| 2015/0052241 A1* | 2/2015 | Walker | H04L 43/08 | |
| | | | 709/224 | |
| 2015/0106209 A1* | 4/2015 | Levi | G06Q 30/0269 | |
| | | | 705/14.66 | |
| 2015/0180719 A1* | 6/2015 | Wu | H04L 47/726 | |
| | | | 709/224 | |
| 2015/0304236 A1* | 10/2015 | Jasperson, Jr. | G06F 3/04842 | |
| | | | 715/772 | |
| 2016/0041848 A1* | 2/2016 | Li | G06F 9/5055 | |
| | | | 718/104 | |
| 2016/0081103 A1* | 3/2016 | Chen | G06F 9/5083 | |
| | | | 370/329 | |
| 2016/0094424 A1* | 3/2016 | Niestemski | H04L 43/0817 | |
| | | | 709/224 | |
| 2016/0147583 A1* | 5/2016 | Ben Simhon | H04L 43/16 | |
| | | | 714/47.3 | |
| 2016/0285717 A1* | 9/2016 | Kim | H04W 12/128 | |
| 2017/0031741 A1* | 2/2017 | Seigel | H04L 41/069 | |
| 2017/0068558 A1* | 3/2017 | Takaizumi | H04L 41/5025 | |
| 2017/0171041 A1* | 6/2017 | Knowler | H04L 43/08 | |
| 2017/0250921 A1* | 8/2017 | Holden | G06F 3/067 | |
| 2017/0331667 A1* | 11/2017 | Cai | H04L 61/1511 | |
| 2018/0039555 A1 | 2/2018 | Salunke et al. | | |
| 2018/0060127 A1* | 3/2018 | Esterkin | G06F 11/302 | |
| 2018/0131574 A1* | 5/2018 | Jacobs | G06F 8/65 | |
| 2018/0131579 A1* | 5/2018 | Jacobs | H04L 41/082 | |
| 2018/0217912 A1* | 8/2018 | Demeilliez | H04L 43/16 | |
| 2018/0234296 A1* | 8/2018 | Kasberg | H04L 47/125 | |
| 2018/0307712 A1* | 10/2018 | Baradaran | H04L 41/142 | |
| 2019/0190788 A1* | 6/2019 | Bugge | H04L 41/14 | |
| 2019/0230003 A1* | 7/2019 | Gao | H04L 41/069 | |
| 2019/0245766 A1* | 8/2019 | Onoue | G06F 11/3495 | |
| 2019/0245806 A1* | 8/2019 | Hanes | H04L 41/147 | |
| 2019/0251038 A1* | 8/2019 | Kang | G06F 12/0815 | |
| 2019/0294473 A1* | 9/2019 | Martin | G06F 11/3006 | |
| 2020/0034208 A1* | 1/2020 | Wray | G06F 9/5083 | |
| 2020/0042338 A1* | 2/2020 | Poothia | G06F 3/067 | |
| 2020/0192708 A1* | 6/2020 | Wu | G06F 16/285 | |

* cited by examiner

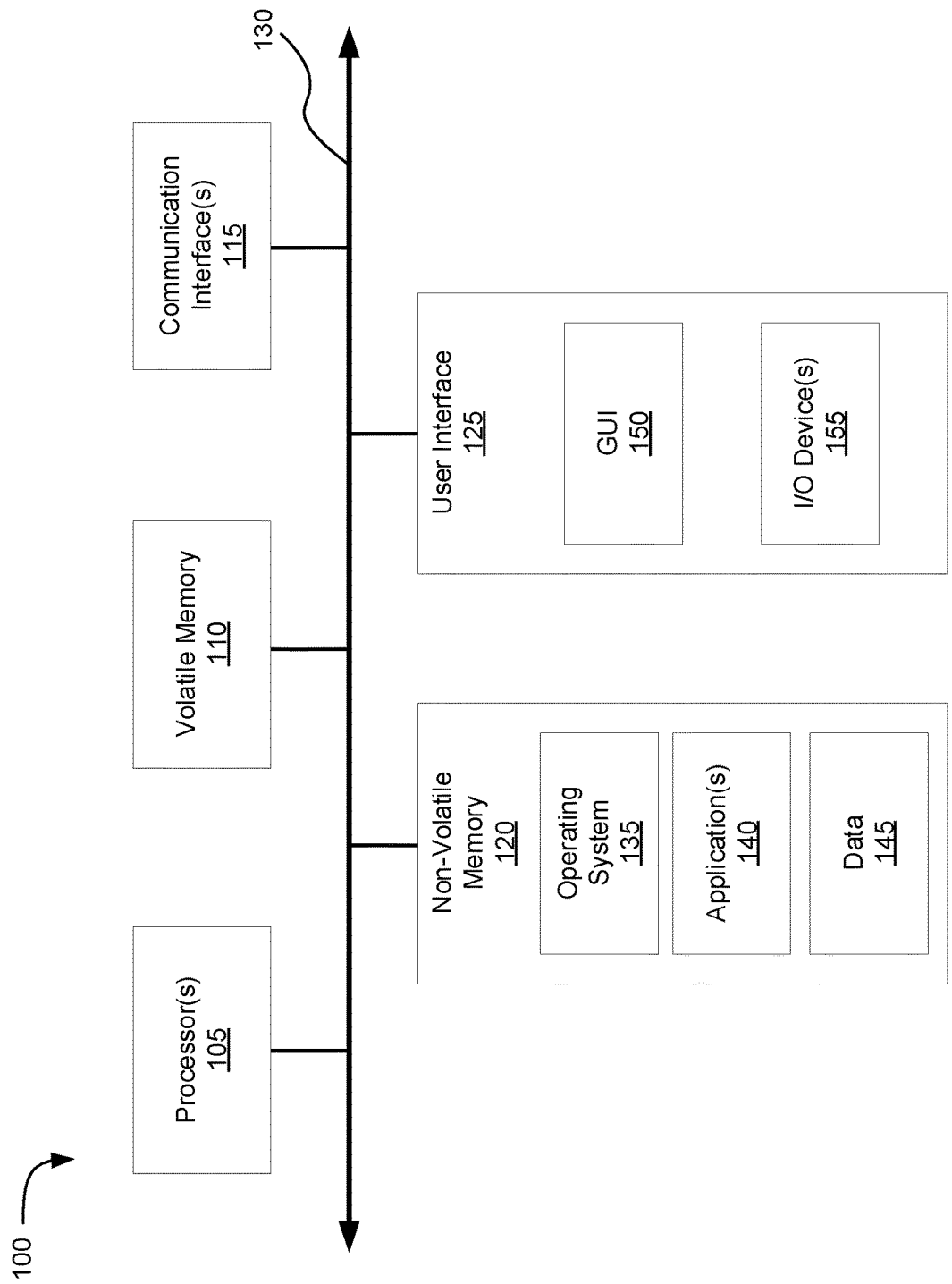

DETERMINING SERVER UTILIZATION USING UPPER BOUND VALUES

CROSS-REFERENCE TO RELATED APPLICATIONS

This application is a continuation of, and claims priority to and the benefit of International Patent Application No. PCT/GR2020/000037, titled "DETERMINING SERVER UTILIZATION USING UPPER BOUND VALUES", and filed on Jul. 22, 2020, the entire contents of which are hereby incorporated herein by references in its entirety for all purposes.

BACKGROUND

In network environments, a server can host or provide access to a plurality of resources or applications for a plurality of users. For example, a user can establish a session to particular application or resource through the server. The resources or applications can include third party resources or applications provided by one or more third party servers. The server can establish one or more connections to the third party servers to provide the access to the plurality of resources and applications for the plurality of users.

SUMMARY

Systems and methods for determining and monitoring server resource utilization are provided herein. An upper bound value can be determined and used to monitor and identify changes in a performance of the server over different ranges of time. The upper bound value can include a metric or percentage of a central processing unit (CPU) utilization of the server. The upper bound value can be compared to a threshold value or threshold limit to determine, for example, when the CPU utilization may be overloaded or reaching an overload condition and to detect a degradation in a performance of the server. In embodiments, a device can detect a change in the performance of the server responsive to the upper bound value of the server exceeding the threshold. The device can generate alerts or indications of the change in performance of the server and indicate one or more causes or reasons for the degradation in the performance of the server. The upper bound value can be used to summarize and monitor the CPU utilization of the server over different ranges of time to identify performance issues with the server or forecast potential performance issues for the server. The upper bound value can be used to avoid or reduce overload conditions, performance issues and/or imbalanced load distributions in a network (e.g., work network, cloud computing environment) and provide increased resource utilization and better user experience.

In at least one aspect, a method is provided. The method can include determining, by a device, a value indicative of an upper bound of a processing load of a server using data points detected for the processing load over a first range of time. The upper bound can correspond to a percentage of the processing load during the first range of time. The method can include monitoring, by the device using the value, the processing load of the server over a second range of time. The method can include determining, by the device, whether the value of the processing load is greater than a threshold during the second range of time. The method can include generating, by the device, an alert for the device responsive to a comparison of the value of the processing load to the threshold.

In embodiments, the method can include generating, by the device, the alert for the device responsive to the value of the processing load being greater than the threshold at one or more points during the second range of time. The method can include detecting, by the device, a degradation in a performance of the server responsive to the value of the processing load being greater than the threshold at one or more points during the second range of time. The method can include continuously determining, by the device, the value of the processing load using a plurality of central processing unit (CPU) utilization loads for the server over a rolling window including the first range of time and the second range of time.

The method can include determining, by the device, a level component of the processing load and a residual component of the processing load. The method can include applying, by the device, a filter to the processing load of the server to generate a moving average for the processing load. The method can include sampling, by the device using a determined window, the moving average of the processing load to generate a level component for the processing load. The determined window can be indicative of a plurality of portions of the first range of time.

The method can include subtracting, by the device, a moving average of the processing load from a signal indicative of the processing load to generate a residual component of the processing load. The signal can be indicative of original data points for the processing load of the server for the first range of time. The method can include applying, by the device, a decomposition function to a level component of the processing load to generate a seasonal component for the processing load. The method can include determining, by the device, a variance of a residual component of the processing load. The method can include determining, by the device, the value of the processing load of the server using a mean of an adjusted component of the processing load, a variance of the adjusted component of the processing load, a seasonal component of the processing load and a variance of a residual component of the processing load.

In at least one aspect, a system is provided. The system can include one or more processors coupled to memory. The one or more processors can be configured to determine a value indicative of an upper bound of a processing load using data points detected for the processing load over a first range of time. The upper bound can correspond to a percentage of the processing load during the first range of time. The one or more processors can be configured to monitor, using the value, the processing load of the server over a second range of time. The one or more processors can be configured to determine whether the value of the processing load is greater than a threshold during the second range of time. The one or more processors can be configured to generate an alert for the device responsive to a comparison of the value of the processing load to the threshold.

In embodiments, the one or more processors can be configured to generate the alert for the device responsive to the value of the processing load being greater than the threshold at one or more points during the second range of time. The one or more processors can be configured to detect a degradation in a performance of the server responsive to the value of the processing load being greater than the threshold at one or more points during the second range of time. The one or more processors can be configured to continuously determine the value of the processing load using a plurality of central processing unit (CPU) utilization loads for the server over a rolling window including the first range of time and the second range of time.

The one or more processors can be configured to determine a level component of the processing load and a residual component of the processing load. The one or more processors can be configured to apply a filter to the processing load of the server to generate a moving average for the processing load. The one or more processors can be configured to sample, using a determined window, the moving average of the processing load to generate a level component for the processing load. The determined window can be indicative of a plurality of portions of the first range of time. The one or more processors can be configured to subtract a moving average of the processing load from a signal indicative of the processing load to generate a residual component of the processing load. The signal can be indicative of original data points for the processing load of the server for the first range of time. The one or more processors can be configured to determine the value of the processing load of the server using a mean of an adjusted component of the processing load, a variance of the adjusted component of the processing load, a seasonal component of the processing load and a variance of a residual component of the processing load.

In at least one aspect, a non-transitory computer-readable medium is provided. The non-transitory computer-readable medium can include instructions that, when executed by the processor of a device, cause the processor to determine a value indicative of an upper bound of a processing load using data points detected for the processing load over a first range of time. The upper bound can correspond to a percentage of the processing load during the first range of time. The non-transitory computer-readable medium can include instructions that, when executed by the processor of a device, cause the processor to monitor, using the value, the processing load of the server over a second range of time. The non-transitory computer-readable medium can include instructions that, when executed by the processor of a device, cause the processor to determine whether the value of the processing load is greater than a threshold during the second range of time. The non-transitory computer-readable medium can include instructions that, when executed by the processor of a device, cause the processor to generate an alert for the device responsive to a comparison of the value of the processing load to the threshold.

The non-transitory computer-readable medium can include instructions that, when executed by the processor of a device, cause the processor to generate the alert for the device responsive to the value of the processing load being greater than the threshold at one or more points during the second range of time. The non-transitory computer-readable medium can include instructions that, when executed by the processor of a device, cause the processor to detecting, by the device, a degradation in a performance of the server responsive to the alert.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 1A is a block diagram of embodiments of a computing device;

DETAILED DESCRIPTION

Figure 1B:
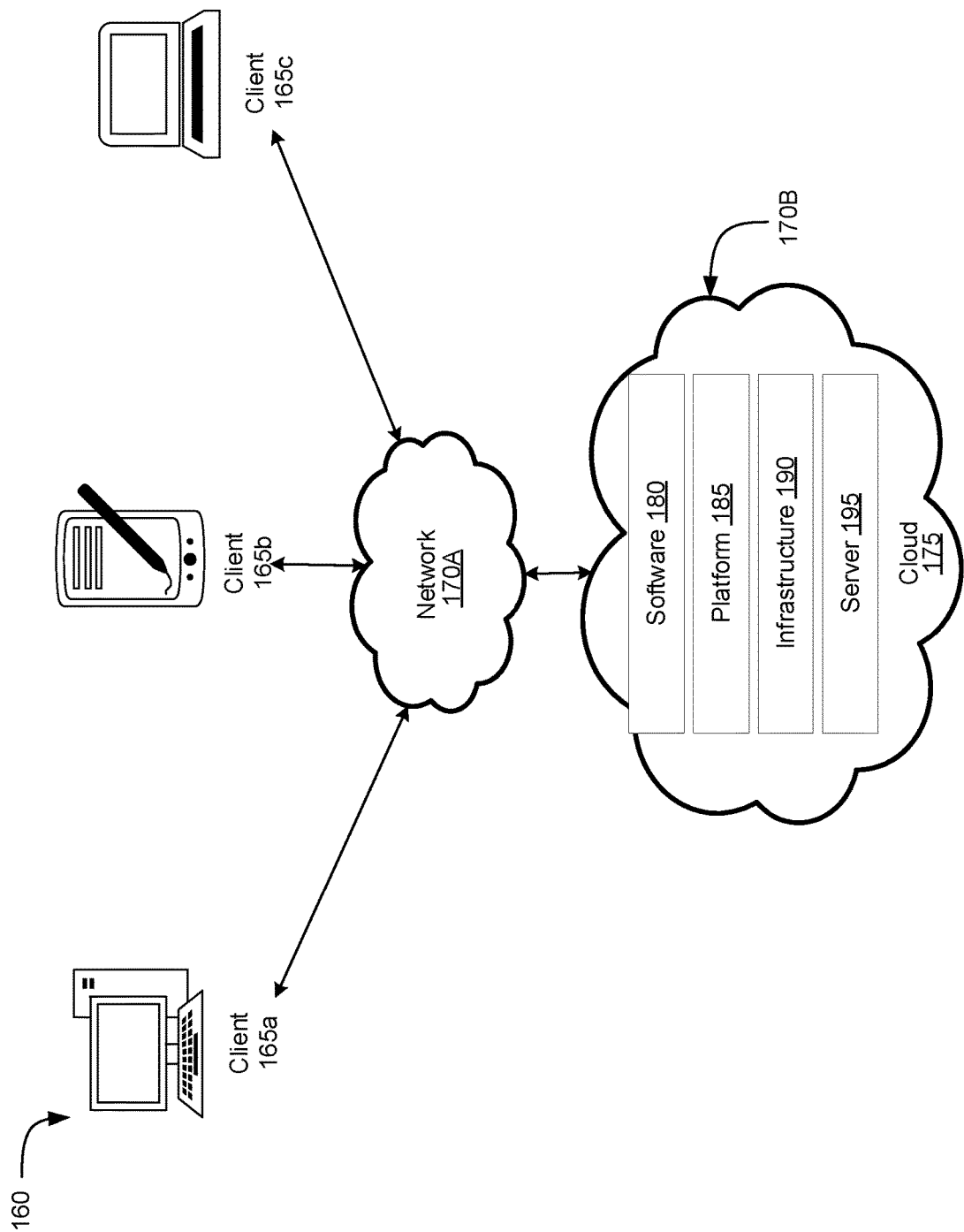
FIG. 1B is a block diagram depicting a computing environment comprising client device in communication with cloud service providers.

Systems and methods for determining and monitoring a performance of a server using resource utilization metrics are provided herein. A device can determine metrics, including but not limited to, an upper bound value of a central processing unit (CPU) utilization of a server, to monitor and/or detect changes in a performance of the server or forecast changes in a performance of the server. The upper bound value can correspond to or be indicative of a level that bounds (e.g., includes) a determined percentage (e.g., 95%, 99%) of an actual utilization of the server. For example, the upper bound value can include a summary of the level of the CPU utilization of the server for a defined range to filter out random spikes (e.g., short term spikes) in CPU utilization and provide an accurate view of the CPU utilization for the defined range of time. The percentage of the actual utilization of the server a respective upper bound value includes can vary and be selected based in part on the properties of the server. A device can use the upper bound value to continually monitor a performance of the server, identify a change in a performance of the server and/or generate alerts or instructions directed to decision making to avoid overload conditions within a computing environment.

In embodiments, the characteristics of the CPU utilization of a server can change over time, for example, over the course of a twenty four hour window or one week period. The respective server can include or be assigned a maximum CPU utilization level that indicates when overload conditions may occur. Systems can monitor an ongoing or current level of the CPU utilization of a server to make decisions on how to best allocate resources in the computing environment using the maximum CPU utilization level. However, sudden or random spikes in CPU utilization can occur that distort or provide an inaccurate view of the CPU utilization for the server. For example, the spikes can be short in duration such that they do not impact or have a minimal impact on an overall performance of the server. The magnitude of these spikes may not be representative of the actual CPU needs of the server and the spikes may exceed the maximum CPU threshold level resulting in false detections of performance issues for the server.

The systems and methods provided herein can determine an upper bound value that summarizes the CPU utilization of a server to filter out inaccurate data (e.g., random spikes) and provide an accurate view of the CPU utilization of the server to monitor, assess and/or perform informed decision making regarding resource utilization within a computing environment. The upper bound value can be determined for a defined range of time and/or in an ongoing or rolling time window to actively monitor the CPU utilization of a server. A device can assign the upper bound value a probability value indicating to a portion or percentage of the CPU utilization to be summarized by the upper bound value or a probability that the observed CPU utilization is less than the upper bound value. For example, the probability value can indicate the portion or percentage (e.g., 95%, 99%) of the CPU utilization to be included within the upper bound value. The probability value can vary based in part on properties of the server and in some embodiments, can be modified or tuned during in response to changes in a performance of the respective server. The upper bound value can include to a level component, residual component and/or a seasonal component of the CPU utilization to account for seasonality and different sources of variability in a plurality of data points (e.g., time series) corresponding to the CPU utilization or a CPU utilization signal.

The device can select a threshold of utilization corresponding to a utilization threshold limit to indicate or forecast a potential overload condition for the server. The upper bound value can be compared to the utilization threshold limit to monitor and detect an overload condition or forecast an overload condition. For example, in response to a detection that the upper bound value has exceeded the utilization threshold limit, an alert can be generated indicating an overload condition and/or indicating a change in a performance of the server. In embodiments, the device can use the upper bound value to predict and forecast potential changes in a performance of a server and to provide informed decision making for resource utilization within a computing environment. In embodiments, the upper bound value can be used to provide increased to avoid or reduce overload conditions, performance issues and/or imbalanced load distributions in a network (e.g., work network, cloud computing environment) and provide increased resource utilization and better user experience.

Section A describes a computing environment which may be useful for practicing embodiments described herein; and Section B describes methods and systems for determining and monitoring server resource utilization using upper bound values.

A. Computing Environment

Prior to discussing the specifics of embodiments of the systems and methods of securing offline data (e.g., browser offline data) for shared accounts, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (WA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Monitoring Server Resource Utilization using Upper Bound Values

Systems and methods for monitoring a performance of a server using resource utilization metrics is provided herein. A device can compute an upper bound value of a central processing unit (CPU) utilization of a server to monitor and/or detect changes in a performance of the server or forecast changes in a performance of the server. For example, the device can determine a value indicative of an upper bound of a processing load of a server using data points detected for the processing load over a range of time. The upper bound can correspond to a percentage of the processing load during the range of time or be indicative of a level that bounds a portion or percentage (e.g., 95%, 99%) of an actual utilization of the server during the range of time. The portion or percentage of the processing load that the value is set to summarize can be selected to filter out or ignore random spikes in utilization of the server. The value can be used to monitor the processing load of the server over one or more ranges of time or on a rolling time window (e.g., continuous basis). The device can determine whether the value of the processing load is greater than a threshold or exceeds the threshold during the respective monitoring period. For example, the value of the processing load exceeding the threshold can indicate an overload condition for the server. The device can determine if a change or degradation in a performance of the server has occurred and generate an alter indicating the change in the performance of the server. In embodiments, the device can use the value to continually monitor a performance of the server, identify a change in a performance of the server and/or generate alerts or instructions directed to decision making to avoid overload conditions within a computing environment.

Figure 2A:
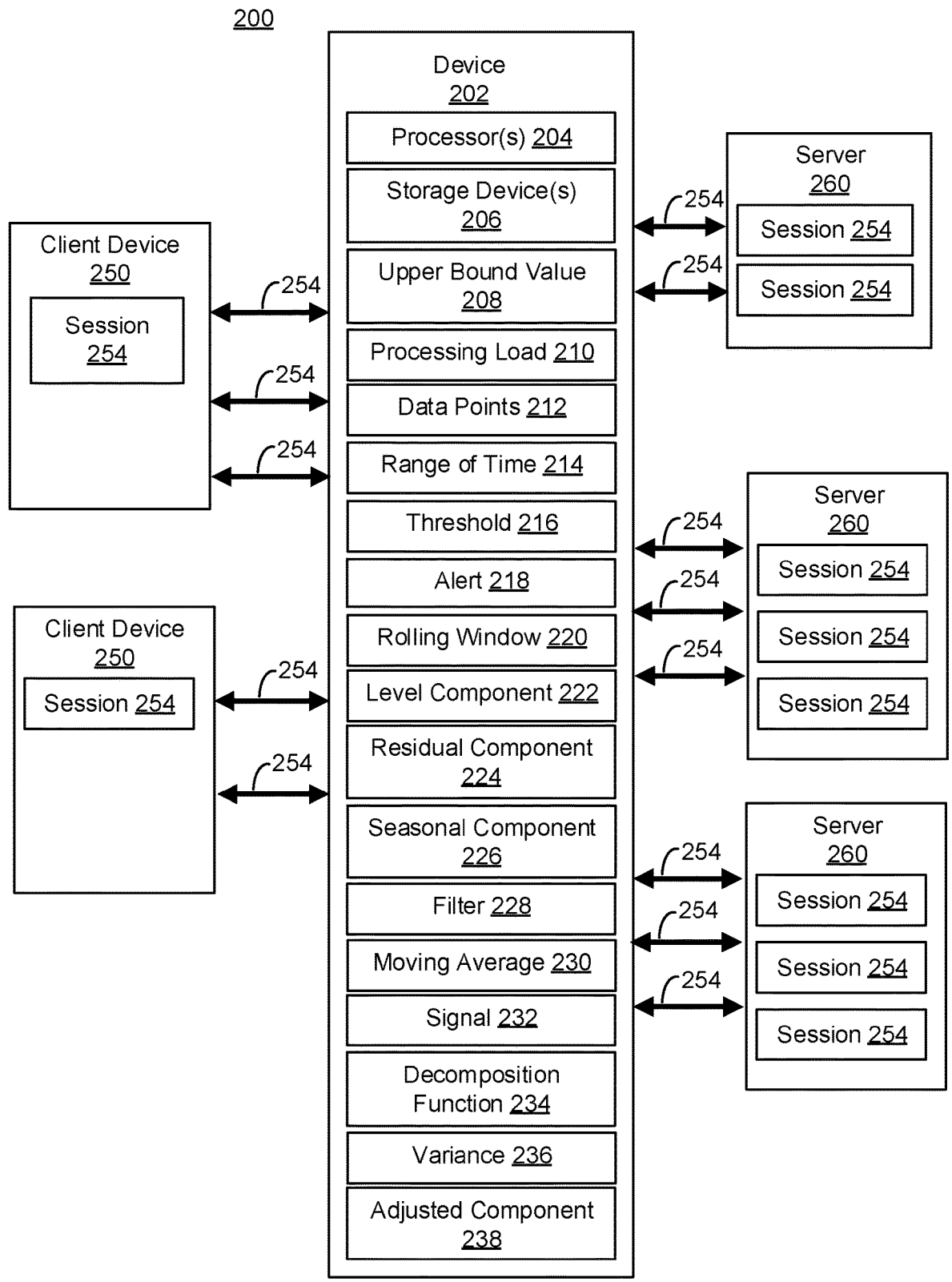
FIG. 2A is a block diagram of a system for determining and monitoring server resource utilization using upper bound values.

Referring to FIG. 2A, depicted is a block diagram of one embodiment of a computing environment 200 having a device 202 to monitor and allocate resources using upper bound values 208. The device 202 can determine upper bound values for processing loads for a plurality of servers 260 in the computing environment to monitor the processing load on the respective servers 260 and reallocate resources, for example, if the upper bound value 208 of a server 260 exceeds a threshold 216.

The computing environment 200 (e.g., server farm, private network, public cloud) can include the plurality of servers 260 to establish sessions 254 to client devices 250 and provide access to resources or applications of the respective servers 260. For example, the device 202 can receive a request for a session 254 from a client device 250 to at least one server 260. The device 202 can monitor one or more sessions 254 on a server 260 by using an upper bound value 208 to monitor a processing load 210 of the server 260. The device 202 can assess and/or reallocate sessions 254 and resources on the server 260 responsive to a comparison of the upper bound value 208 to the processing load 210. The device 202 can use the upper bound value 208 to balance load across the plurality of servers 260, increase or maximize resource utilization across the computing environment 200 and increase a user experience of users of the respective client devices 250. In embodiments, the computing environment 200 can be the same as or substantially similar to the computing environment 160 of FIG. 1B.

The device 202 can be implemented using hardware or a combination of software and hardware. For example, components of the device 202 can include logical circuitry (e.g., a central processing unit or CPU) that responses to and processes instructions fetched from a memory unit (e.g., storage device 206). Components of the device 202 can include or use a microprocessor or a multi-core processor. A multi-core processor can include two or more processing units (e.g., processor 204) on a single computing component. Components of the device 202 can be based on any of these processors, or any other processor capable of operating as described herein. Processors can utilize instruction level parallelism, thread level parallelism, different levels of cache, etc. For example, the device 202 can include at least one logic device such as a computing device or server having at least one processor 204 to communicate with one or more client devices 250. The components and elements of the device 202 can be separate components or a single component. The device 202 can include a memory component (e.g., storage device 206) to store and retrieve data (e.g., upper bound values 208, processing load 210, data points 212, thresholds 216). The memory can include a random access memory (RAM) or other dynamic storage device, coupled with the storage device 206 for storing information, and instructions to be executed by the device 202. The memory can include at least one read only memory (ROM) or other static storage device coupled with the storage device 206 for storing static information and instructions for the device 202. The memory can include a storage device 206, such as a solid state device, magnetic disk or optical disk, to persistently store information and instructions. The device 202 can be the same as or substantially similar to computer 100 of FIG. 1A.

The device 202 can include a processor 204. The processor 204 can include non-volatile memory that stores computer instructions and an operating system. For example, the computer instructions can be executed by the processor 204 out of volatile memory to perform all or part of the method 300. In some embodiments, the device 202 can include a non-transitory computer-readable medium, comprising instructions that, when executed by the processor 204 of the device 202, cause the processor 204 to perform all or part of the method 300. The processor 204 can include a database and be configured to generate and/or store values including, but not limited to, upper bound values 208, processing load 210, data points 212, and thresholds 216. The processor 204 can include non-volatile memory that stores computer instructions and an operating system. For example, the computer instructions can be executed by the processor 204 out of volatile memory to perform all or part of the method 300. The device 202 can include a non-transitory computer-readable medium that includes instructions that, when executed by the processor 204 of the device 202 cause the processor 204 to execute or perform the functionalities of the method 300.

The device 202 can determine or generate upper bound values 208. The upper bound values 208 or value 208 can include or correspond to a metric determined based on a processing load 210 of a server 260 to monitor or assess the processing load level. The upper bound value 208 can include or correspond to a percentage or portion of the processing load 210 that is determined using level components 222, residual components 224, seasonal components 226 and variance values 236 of the processing load 210. The upper bound value 208 can be configured to bound, summarize or include a percentage or portion of the processing load at a time point or time interval for a range of time 214 or rolling window 220. The device 202 can determine or compute an upper bound value 208 to summarize a previous level, current level and/or ongoing level of the processing load 210 of a server 260 to make informed decisions regarding the allocation of resources (e.g., CPU resources) within the computing environment 200. The upper bound value 208 can include an ongoing upper bound or rolling upper bound of the processing load 210 to account for seasonality and/or different sources of variability in a time series of data points 212 correspond to load values for the processing load 210 during a range of time 214.

The processing load 210 can include, but not limited to, a CPU utilization value, a resource utilization value, a device usage value, or a load on one or more processors of a server 260. The processing load 210 can include or correspond to load from one or more sessions 254 to a server 260, one or more applications provided by or hosted by a server 260. The device 202 can determine and monitor the processing load 210 on a plurality of servers 260 of the computing environment 200. The data points 212 can include or correspond to individual load values or a level of the processing load determined for a server 260 at a particular time point or time interval (e.g., 1 hour intervals). For example, the device 202 can determine a plurality of data points 212 representing load values at a plurality of time points for a range of time 214 or for a rolling window 220. In embodiments, the plurality of data points 212 can form the processing load 210 for a server 260. The processing load 210 can be received or generated in the form of a signal 232. For example, the signal 232 can include a time series of data points 212 representing the processing load 210 of a server 260 for a range of time 214 or rolling window 220.

The device can determine a range of time 214. The range of time 214 can include or correspond to a time range, time window or window period. The range of time 214 can include to be selected to represent a time range that a server 260 can be monitored (e.g., previous time range, future time range). The range of time 214 can include, but not limited to, a day, multiple days, a few weeks or a few months. The device 202 can select the range of time 214 based in part on properties of the server 260 to be monitored and/or a time value (e.g., length of monitoring). The rolling window 220 (e.g., rolling time window) can include or correspond to a continuous monitoring period or a period of monitoring having no set end time. The rolling window 220 can include, but not limited to, one or more range of time 214 or monitoring in an ongoing manner. In embodiments, the device 202 can determine or set a rolling window 220 to determine the upper bound value 208 for the processing load 210 of a server 260 on a fixed contiguous block of prior observations and using it as a forecast to monitor future ranges of time 214 for a server 260. In embodiments, moving average values and weighted values can be applied to data points 212 of the processing load 210 such that more recent or newer data points 212 have a different weight (e.g., greater, lower) than weights assigned to older data points 212 in a series of data points 212 of the processing load 210 for the rolling window 220.

The device 202 can determine or select a threshold 216 for the processing load 210 of a server 260. The threshold 216 can include or correspond to a load limit and be set as a portion or percentage of the processing load 210 to indicate an overload condition or predict an overload condition on the respective server 260. The threshold 216 can vary and can be selected based in part on a time period (e.g., time of day, time of year) and/or the server 260 to be monitored. In embodiments, two or more servers 260 can have the same threshold 216. In embodiments, two or more servers 260 can have different thresholds 216. The threshold 216 for a server 260 can be selected to be a portion or percentage of the processing load 210 of the server 260. The portion or percentage can vary and can be selected based in part on a time period (e.g., time of day, time of year) and/or the server 260 to be monitored. In one embodiment, the threshold 216 can be set at 80% of a processing load 210 of a server 260 such that if the upper bound value 208 is greater than or exceeds 80% of the processing load 210 of the server 260, the upper bound value 208 can be greater than or exceed the respective threshold 216 for the server 260. The threshold 216 can include a number, a range of numbers, a percentage, a range of percentages, a value, and/or a range of values.

The device 202 can generate an alert 218. The alert 218 can include or correspond to a notification The alert 218 can include a notification indicating one or more of: an overload condition for a server 260, a degradation in performance of the server 260, a cause for the increase in processing load 210, a time of day of the event and/or a number of sessions 254 active on the server 260. The alert 218 can identify a resource, session 254 or application executing on the server 260 and causing the overload condition. In embodiments, the device 202 can provide the alert 218 through a window or menu of a user interface of the device 202 or one or more client devices 250 to notify a user of the device 202 or one or more client devices 250 of the overload condition.

The device 202 can determine a level component 222. The level component 222 can include or correspond to an average value in a series of values or in a time series of values (e.g., series of data points 212) for the processing load 210. The device 202 can determine the level component 222 of the series of data points 212 of the processing load 210. For example, the processing load 210 can be in the form of a signal or time series of a series of data points 212 corresponding to load values at individual time points or time intervals (e.g., 1 hour intervals) for the processing load 210 of a server 260 and the device 202 can decompose the processing load signal 210 to determine the level component 222 of the series of data points 212 of the processing load 210. The level component 222 is described in greater detail below with respect to (306) of method 300 of FIG. 3.

The device 202 can determine a residual component 224. The residual component 224 can include or correspond to a difference between an original load value of the processing load 210 and a predicted or average value of the processing load 210. For example, the device 202 can subtract a moving average 230 of the processing load 210 from a signal (e.g., original signal, original data points 212) indicative of the processing load 210 to generate the residual component 224 of the processing load 210. The residual component 224 is described in greater detail below with respect to (308) of method 300 of FIG. 3.

The device 202 can determine a seasonal component 226. The seasonal component 226 can include or correspond to a variation in a time series representing the processing load 210. For example, the seasonal component 226 can include or correspond regular or normal fluctuations or variations in the processing load 210 of a server 260 based in part on a time value or seasonality of the processing load 210. For example, the device 202 can apply a decomposition function 234 to the level component 222 of the processing load 210 to generate the seasonal component 226 for the processing load 210. In embodiments, the device 202 can use or include additive or multiplicative seasonality to determine the seasonal component 226. The decomposition function 234 can include or correspond to a classical decomposition algorithm, additive decomposition, multiplicative decomposition, classical decomposition method and/or a combination of two or more of them. In embodiments, the device 202 can apply the decomposition function 234 to the processing load 210 into trend components, seasonal components, cyclical components, and irregular (e.g., random) components. The seasonal component 226 is described in greater detail below with respect to (310) of method 300 of FIG. 3.

The device 202 can determine an adjusted component 238 (e.g., seasonally adjusted component 226). The adjusted component 238 can include or correspond to a variation in a time series representing the processing load 210. For example, the adjusted component 238 or seasonal adjusted component 226 can regular or normal fluctuations or variations in the processing load 210 of a server 260 based in part on a time value or seasonality of the processing load 210. The device 202 can apply a decomposition function 234 to the level component 222 of the processing load 210 to generate the adjusted component 238 for the processing load 210. The adjusted component 238 is described in greater detail below with respect to (310) of method 300 of FIG. 3.

The device 202 can determine one or more variance values 236 for the residual components 224, the adjusted components 238. A variance value 236 can include or correspond to a measure or metric of how far a value of the data set of values is from a mean of the respective data set of values. The device 202 can use samples or a series of values of the residual component 224 to determine a variance 236 of the residual component 224. The device 202 can use samples or a series of values of the adjusted component 238 to determine a variance 236 of the adjusted component 238. For example, the device 202 can use samples or a series of values of the residual component 224 and/or adjusted component 238 to determine a variance value 236 corresponding to each interval of a determined range of time 214. The variance values 236 are described in greater detail below with respect to (312) of method 300 of FIG. 3.

The device 202 can apply a filter 228 to the processing load 210 of the server 260 to generate a moving average 230 for the processing load 210. The filter 228 can include, but not limited to, a moving average filter or exponentially weighted moving average (EWMA) algorithm. The moving average 230 can include or correspond to an average or mean of a set of data points 212 over a defined range of time 214, time period, or rolling window 220. For example, the moving average 230 can include a mean of a plurality of data points 212 of the processing load 210 for the first range of time 214 at a determined time interval (e.g., 1 hour intervals).

Server 260 can include or deployed as, and/or be executed on any type and form of computing device, such as any desktop computer, laptop computer, or mobile device capable of communication over at least one network and performing the operations described herein. For example, servers 260 can include or correspond to one computer, a plurality of computers, or a network of distributed computers such as computer 100 shown in FIG. 1A. In embodiments, servers 260 can executes one or more applications on behalf of one or more of client devices 250 (e.g., as an application server), although other uses are possible, such as a file server, gateway server, proxy server, or other similar server uses. Client devices 250 may seek access or to establish a session 254 to a hosted application on a server 260. For example, a client device 250 can generate a request to establish a session 254 to at least one server 260 for an application or resource provided by the server 260. The request can identify or indicate an application, resource and/or client device 250 transmitting the request.

The client device 250 can include, but not limited to a computing device or a mobile device. The client device 250 can include or correspond to an instance of any client device, mobile device or computer device described herein. For example, the client device 250 can be the same as or substantially similar to computer 100 of FIG. 1A. The client device 250 can couple with the device 202 to establish one or more sessions 254 to one or more servers 260. In embodiments, the client device 250 can execute or run a client application, for example, provided by device 202 to provide access to a server 260 or to enable access to an application or resource provided by a server 260. For example, the client application can execute or run within a browser (e.g., embedded browser) of the client device 250.

The sessions 254 can include a channel, connection or session between a client device 250 and the device 202, between the device 202 and a server 260 and/or between a client device 250 and a server 260. The sessions 254 can correspond to or be used to establish an application session (e.g., virtual application), an execution session, a desktop session, a hosted desktop session, a terminal services session, a browser session, a remote desktop session, a URL session and/or a remote application session. The session 254 may include encrypted and/or secure sessions established between the device 202 and a client device 250. For example, a session 254 may include an encrypted session and/or a secure session established between the device 202 and a client device 250. The encrypted session 254 can include an encrypted file, encrypted data or traffic transmitted between the device 202 and a client device 250.

The above-mentioned elements or entities may be implemented in hardware, or a combination of hardware and software, in one or more embodiments. Components of the device 202 may be implemented using hardware or a combination of hardware or software detailed above in connection with FIGS. 1A-1B. For instance, these elements or entities can include any application, program, library, script, task, service, process or any type and form of executable instructions executing on hardware of a device (e.g., device 202). The hardware includes circuitry such as one or more processors in one or more embodiments.

Figure 2B:
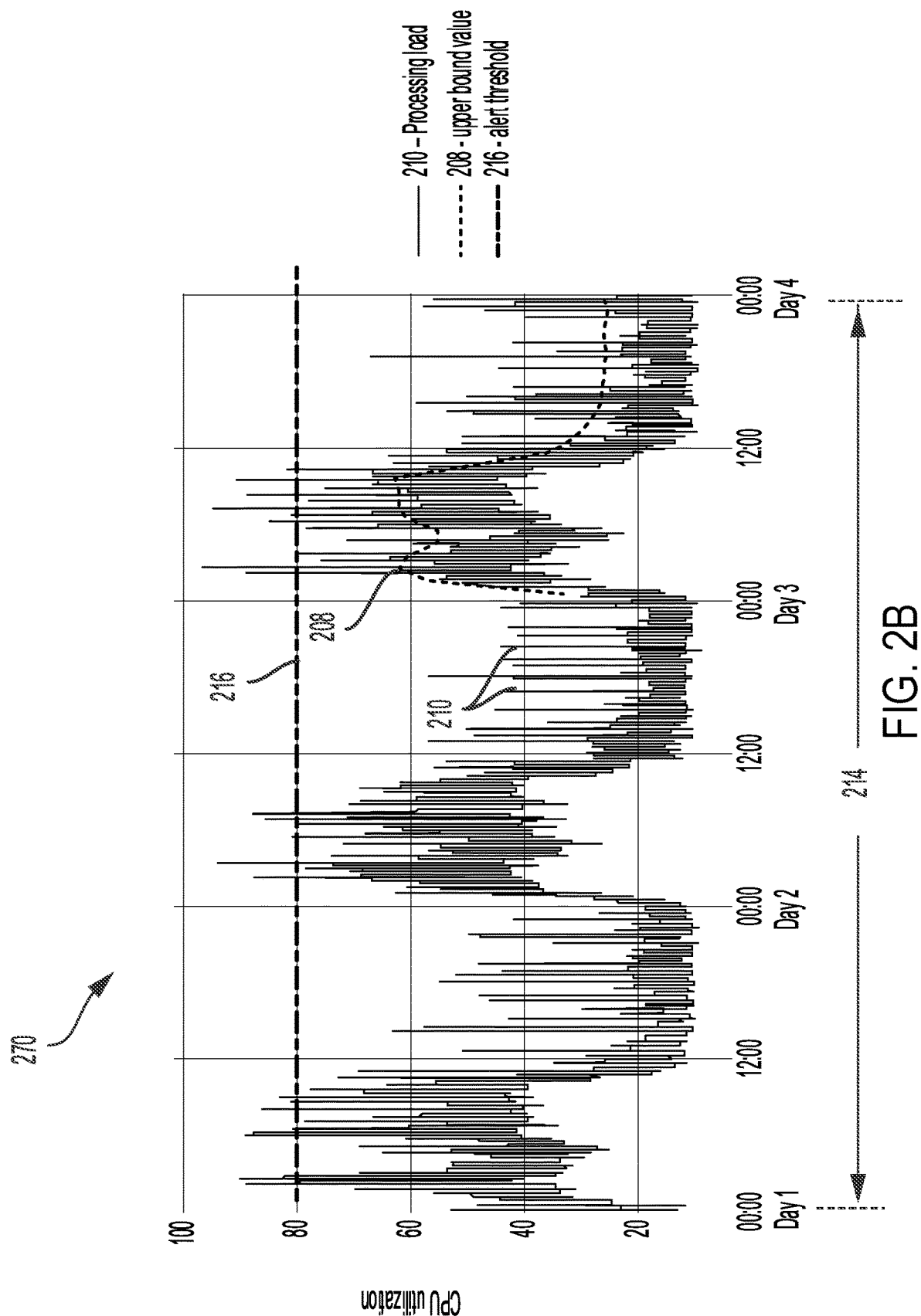
FIG. 2B is a graph of a computed upper bound value of a processing load of a server for a range of time.

Referring now to FIG. 2B, depicted is a graph 270 of a computed upper bound value 208 of a processing load 210 of a server 260 for a range of time 214 (e.g., 4 days). The graph 270 includes an observed or actual processing load 210 of a server 260 (e.g., indicated by solid lines), a threshold 216 for the server 260 (e.g., indicated by a straight dashed line) and the upper bound value 208 for the server 260 (e.g., indicated by a dashed line). The device 202 can continuously determine the upper bound value 208 for the server 260, for example, during the range of time 214 at determined intervals (e.g., 1 hour intervals) for the range of time 214.

The upper bound value 208 can include or correspond to a percentage or portion of the processing load 210. The device 202 can determine the upper bound value 208 to bound, summarize or include a percentage or portion of the processing load 210 (e.g., 95%, less than 100%) during the range of time 214 to filter out or remove spikes or random variations in the processing load 210 of the server 260. The device 202 can select the threshold 216 to be a percentage (e.g., 80%) or portion of a processing load limit, CPU utilization limit or maximum processing load for the server 260. The device 202 can use the upper bound value 208 to monitor and assess the processing load 210 on a server 260. For example, the device 202 can continually compare the upper bound value 208 to the threshold 216 to determine if the upper bound value 208 exceeds the threshold 216 during the range of time 214 (e.g., monitoring period). In graph 270, the upper bound value 208 stays less then or below the threshold 216, thus the device 202 does not generate an alert 218. In embodiments, the device 202 can generate an alert 218 for the device 202 and/or for a client device 250 if the upper bound value 208 is greater than the threshold 216 during one or more points in the range of time 214. The upper bound value 208 can be used to summarize and monitor a level of the processing load 210 (e.g., CPU utilization) of a server 260. In some embodiments, the device 202 can use the upper bound value 208 to make informed decisions regarding the allocation of resources (e.g., CPU resources) within a computing environment 200.

Figure 3:
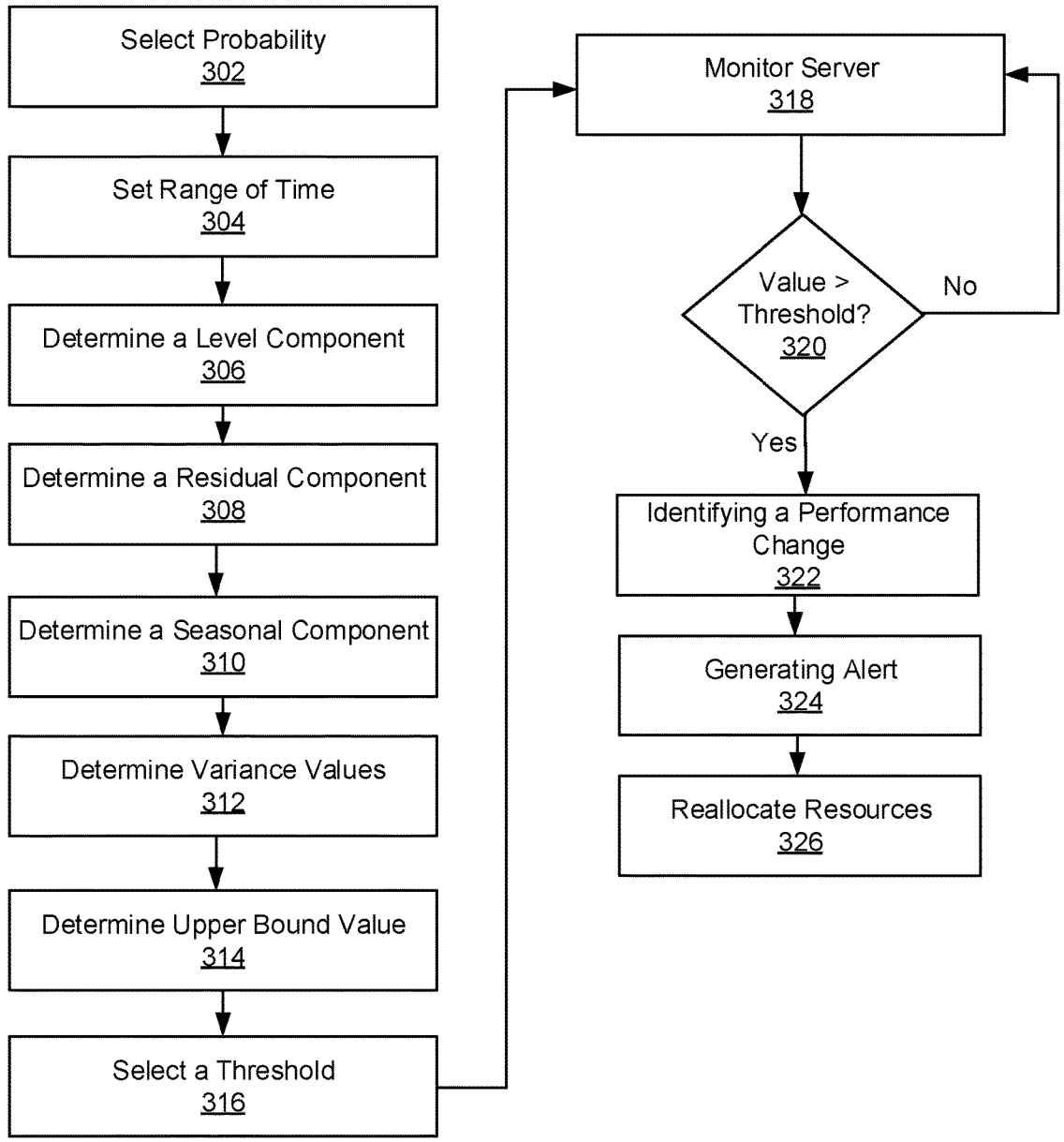
FIG. 3 is a flow diagram of a method for determining and monitoring server resource utilization using upper bound values.

Referring now to FIG. 3, depicted is a flow diagram of one embodiment of a method 300 for determining an upper bound value and monitoring server resource utilization using the upper bound value. In brief overview, the method 300 can include one or more of: selecting a probability for upper bound value (302), setting a range of time (304), determining a level component (306), determining a residual component (308), determining a seasonal component (310), determining variance values (312), determining an upper bound value (314), selecting a threshold (316), monitoring a server (318), determining if a value is greater than threshold (320), identifying a performance change (322), generating an alert (324), and reallocating resources (326). The functionalities of the method 300 may be implemented using, or performed by, the components detailed herein in connection with FIGS. 1A-2A.

Referring now to operation (302), and in some embodiments, a probability can be selected for an upper bound value. A device 202 can determine a value 208 (e.g., upper bound value 208) indicative of an upper bound of a processing load 210 of a server 260 using data points 212 detected for the processing load 210 over a first range of time 214. The upper bound or upper bound value 208 can correspond to a percentage of the processing load 210 during the first range of time 214. The processing load 210 can include, but not limited to, a CPU utilization value, a resource utilization value, a device usage value, or a load on one or more processors. For example, the characteristics of a processing load 210 (e.g., CPU utilization, resource utilization) can change over time due to increases or decreases in demand for different resources of a server 260. The device 202 can determine or compute an upper bound value 208 (also referred to herein as value) to summarize a previous level, current level and/or ongoing level of the processing load 210 of a server 260 to make informed decisions regarding the allocation of resources (e.g., CPU resources) within a computing environment 200. The upper bound value 208 can include an ongoing upper bound or rolling upper bound of the processing load 210 to account for seasonality and/or different sources of variability in a time series of data points 212 correspond to load values for the processing load 210 during a range of time 214.

The device 202 can select a probability for the upper bound value 208. For example, the upper bound value 208 can correspond to a probability value, "p", that describes or corresponds to a probability that an observed processing load 210 (e.g., utilization) can be less than or smaller than the respective upper bound value 208. The probability can include or correspond to a percentage or portion of the processing load 210 (e.g., actual processing load value) for the upper bound value 208 to summarize or include. The percentage or portion of the processing load 210 can correspond to a probability value indicating a probability that the upper bound value 208 bounds, includes or summarizes the processing load 210 (e.g., a current or ongoing level of CPU resources of a system) of a respective server 260. In some embodiments, the percentage can range from 95% to 99%, less than 95% or more than 99%. The percentage or portion can vary within or outside this range based at least in part on a server 260 to be monitored, a time of day and/or user preferences (e.g., admin controls, client device controls, end user requests). In embodiments, the percentage or portion selected for two different servers 260 can be different or the same.

In embodiments, the device 202 can continuously determine the value 208 (e.g., upper bound value 208) of the processing load 210 using a plurality of CPU utilization loads 210 for the server 260 over a rolling window 220 that includes the first range of time 214 and the second range of time 214. The device 202 can actively modify or tune the upper bound value 208 such that the upper bound value 208 changes at different time points, time intervals or time increments. The upper bound value 208 can continually monitor the processing load 210 of a server 260 such that the upper bound value 208 changes in response to changes in one or more previous values of the processing load 210 of the server 260. For example, as new data points 212 (e.g., load values) of the processing load 210 are received, the device 202 can modify or tune the upper bound value 208 such that the upper bound value 208 remains at, summarizes or bounds a percentage (e.g., 95%, 99%) of an actual value of the processing load 210 using one or more previous or most recent data points 212. The device 202 can continually determine the upper bound value 208 to provide ongoing or active monitoring of a server 260 for a rolling window 220. The rolling window 220 can include one or more previous ranges of time 214.

Referring now to operation (304), and in some embodiments, a range of time can be set. The device 202 can select a first or initial range of time 214 to determine or retrieve previous or most recent data points 212 (e.g., load values) of the processing load 210 of a server 260. The range of time 214 can include a time period or time interval corresponding to a current session 254 of a server 260 and/or one or more previous sessions 254 of a server 260 to calculate the upper bound value 208. The range of time 214 can vary and be selected based in part on the server 260 and/or an amount of data points 212 (e.g., one week worth of data, one month worth of data, a few days' worth of data) to be used to determine the upper bound value 208.

The device 202 can determine the upper bound value 208 in an ongoing or active manner using recent or previous processing load 210 (e.g., recent CPU activity) over a rolling time window 220 of size "T" or a range of time 214 of size "T." For example, the size T of the rolling window 220 can include, but not limited to, a few days, a few weeks or a months' worth of data points 212. The device 202 can determine or estimate the upper bound value 208 (e.g., $\mu_i$) for a determined time interval (e.g., each hour of a day, $\mu_i$ (i=1, ..., 24)) within the rolling window 220. For example, in some embodiments, the processing load 210 of a server 260 can have strong within day seasonality such that the device 202 can determine the upper bound value 208 for defined intervals within a day time period or rolling window 220.

In some embodiments, the range of time 214 can include a current time point and/or one or more future time points. For example, the device 202 can determine the upper bound value 208 using a current data point 212 of a current time point and one or more data points 212 at one or more future time points to continually determine the upper bound value 208 such that the upper bound value 208 corresponds to or reflects one or more previous levels of the processing load 210 and a current level of the processing load 210.

Referring now to operation (306), and in some embodiments, a level component can be determined. The device 202 can determine a level component 222 of the processing load 210. The level component 222 can include or correspond to an average value in a series of values or in a time series of values (e.g., series of data points 212) for the processing load 210. For example, the processing load 210 can be in the form of a signal or time series of a series of data points 212 corresponding to load values at individual time points or time intervals (e.g., 1 hour intervals) for the processing load 210 of a server 260. The device 202 can determine the level component 222 of the series of data points 212 of the processing load 210.

In embodiments, the device 202 can perform decomposition to determine or recover characteristics of the processing load 210 of a server 260, including but not limited to, a level component 222, a residual component 224 and a seasonal component 226. The characteristics of the processing load 210 can be used to determine the upper bound value 208 for the processing load 210. In embodiments, the device 202 can decompose the data points 212 of the processing load 210 into a level component 222. For example, the device 202 can decompose the data points 212 corresponding to a recorded or observed time series of the processing load 210 (e.g., CPU utilization) in a range of time 214 or rolling window 220.

In embodiments, the device 202 can apply a filter 228 to the processing load 210 of the server 260 to generate a moving average 230 for the processing load 210. The filter 228 can include, but not limited to, a moving average filter or exponentially weighted moving average (EWMA) algorithm. For example, the device 202 can determine the moving average 230 of the data points 212 of the processing load 210 using a determined time interval (e.g., 1 hour intervals) or window size (e.g., 1 hour). The moving average 230 can include or correspond to an average or mean of a set of data points 212 over a defined range of time 214 or time period. For example, the moving average 230 can include a mean of a plurality of data points 212 of the processing load 210 for the first range of time 214 at a determined time interval (e.g., 1 hour intervals).

The device 202 can sample, using a determined window, the moving average 230 to generate the level component 222 for the processing load 210. The determined window can be indicative of a plurality of portions of the first range of time 214. For example, the device 202 can sample or subsample the moving average 230 of the processing load 210 to determine one sample per the defined time interval. In one embodiment, the device 202 can sample or subsample the moving average 230 of the processing load 210 to determine one sample per hour for a defined time interval corresponding to one hour intervals.

Referring now to operation (308), and in some embodiments, a residual component can be determined. The device 202 can determine a residual component 224 of the processing load 210. In embodiments, the device 202 can subtract the moving average 230 of the processing load 210 from a signal indicative of the processing load 210 to generate the residual component 224 of the processing load 210. The signal can be indicative of or correspond to an original signal of the processing load 210 (e.g., original time series for CPU utilization) or original data points 212 of the processing load 210. For example, the device 202 can determine the residual component 224 of the processing load 210 by subtracting the moving average 230 from the original time series or original signal representing the processing load.

Referring now to operation (310), and in some embodiments, a seasonal component can be determined. The device 202 can determine a seasonal component 226 for the processing load 210. For example, the device 202 can apply a decomposition function 234 to the level component 222 of the processing load 210 to generate the seasonal component 226 for the processing load 210. In some embodiments, the device 202 can use or include additive or multiplicative seasonality to determine the seasonal component 226. The decomposition function 234 can include or correspond to a classical decomposition algorithm, additive decomposition, multiplicative decomposition, classical decomposition method and/or a combination of two or more of them. In embodiments, the device 202 can apply the decomposition function 234 to the processing load 210 into trend components, seasonal components, cyclical components, and irregular (e.g., random) components.

In some embodiments, the seasonal component 226 can include a series of seasonal components having a determined resolution and period of time. For example, in one embodiment, the seasonal component 226 ("$S_i$") can include a series of seasonal components having a determined hourly resolution for a period of one day (e.g., 24 hours) and the series of the seasonal component 226 can be denoted as $S_i$, (i=1, . . . , 24). The device 202 can determine an adjusted component 238 (e.g., seasonally adjusted component) for the processing load 210. For example, the device 202 can apply a decomposition function 234 to the level component 222 of the processing load 210 to generate the adjusted component 238 for the processing load 210. In some embodiments, the device 202 can use or include additive or multiplicative seasonality to determine the adjusted component 238.

Referring now to operation (312), and in some embodiments, variance values can be determined. The device 202 can determine a variance value 236 of the residual component 224 and a variance value 236 of the adjusted component 238. A variance value 236 can include or correspond to a measure or metric of how far a value of the data set of values is from a mean of the respective data set of values. The device 202 can use samples or a series of values of the residual component 224 to determine a variance 236 of the residual component 224. For example, the device 202 can use samples or a series of values of the residual component 224 to determine a variance value 236 corresponding to each interval of a determined range of time 214. In one embodiment, the device 202 can use samples or a series of values of the residual component 224 to determine the variance value 236 corresponding to each hour for a time interval of one hour per the determined range of time 214 (e.g., 24 hours) and generate 24 variance values 236 ("$V_{r\_i}$") represented as $V_{r\_i}$, (i=1, . . . , 24). The number of variance values 236 for the residual component 224 can vary and be selected based in part on the selected time interval and range of time 214.

The device 202 can use samples or a series of values of the adjusted component 238 to determine a mean ("$M_{sa}$") of the adjusted component 238 and a variance value ("$V_{sa}$") of the adjusted component 238. In embodiments, the mean of the adjusted component 238 can be determined used samples or a series of value of the adjusted component 238 over a window of size "T", using the following equation:

$$m_{sa} = \sum_{i=y}^{T*x} sa_i/(T*X), \quad (1)$$

where T represents the number of days of the used window, "x" represents the time window or range of time 214 (e.g., one day, 24 hours), i represents the time interval (e.g., y intervals, 1 hour intervals) and sa represents the adjusted component 238 (e.g., seasonally adjusted signal). The device can use samples or a series of values of the adjusted component 238 to determine a variance value 236 of the adjusted component 238 corresponding to each interval of a determined range of time 214. In one embodiment. The device 202 can use samples or a series of values of the adjusted component 238 to determine the variance value 236 corresponding to each hour for a time interval of one hour per the determined range of time 214 (e.g., 24 hours) and generate 24 variance values 236 ("$V_{sa}$") represented as $V_{sa\_1}$, (i=1, ..., 24).

For example, the variance value 236 of the adjusted component 238 ("$V_{sa}$") can be determined using the following equation:

$$V_{sa} = \sum_{i=y}^{T*x} sa_i^2/(T*X) - m_{sa}^2 \quad (2)$$

Where "T" represents the number of days of the used window, "x" represents the time window or range of time 214 (e.g., one day, 24 hours), i represents the time interval (e.g., y intervals, 1 hour intervals), "sa" represents the adjusted component 238 (e.g., seasonally adjusted signal), "$m_{sa}^2$" represents the mean of the adjusted component 238. The number of variance values 236 for the adjusted component 238 can vary and be selected based in part on the selected time interval and range of time 214.

The device 202 can use or perform different computations to determine the variance values 236 for the residual component 224 and/or the adjusted component 238. In some embodiments, the device 202 can remove or exclude adjusted components 238 outside a determined range or exceeding a determined threshold (e.g., exclude outliers) from the variance value determination (e.g., values used in formula 2). The removed or excluded component values can include outliers or values corresponding to errors in an estimation of the adjusted component 238. The outlier adjusted component 238 can cause high variations in a recovered seasonally adjusted signal and can result in overestimation of the variance of the adjusted component 238. The device 202 can detect or determine the outlier component values using tolerance ranges, thresholds, and/or applying a boxplot outlier detection threshold. The device 202 can remove or exclude the adjusted component 238 identified as being outliers from the determination of the variance values 236 for the adjusted component 238.

In some embodiments, the device 202 can determine that the level components 222 and the residual components 224 of the processing load 210 are uncorrelated and follow a Normal Distribution. For example, the device 202 can compare the variance values 236 for the adjusted component 238 to the variance values 236 for the residual component 224 to determine that the level components 222 and the residual components 224 of the processing load 210 are uncorrelated and follow a Normal Distribution.

Referring now to operation (314), and in some embodiments, an upper bound value can be determined. The device 202 can determine a value 208 indicative of an upper bound of a processing load 210 using data points 212 detected for the processing load 210 over a first range of time 214. The upper bound can correspond to a percentage of the processing load 210 during the first range of time 214. The device 202 can determine the value 208 of the processing load 210 of the server 260 using a mean of an adjusted component 238 of the processing load 210, a variance 236 of the adjusted component 238 of the processing load 210, a seasonal component 226 of the processing load 210 and a variance 236 of the residual component 224 of the processing load 210. In embodiments, the device 202 can determine the upper bound value 208 using different equations or methods based in part on a type of seasonality used or applied in determining the variance values 236. For example, the device 202 can determine the upper bound value 208 using different equations or methods based in part if additive seasonality was used in or if multiplicative seasonality was used in determining the variance values 236. In embodiments, if additive seasonality was used in determining the variance values 236, the device 202 can determine the upper bound value 208 for the processing load 210 using the following equation:

$$u_i = a*m_{sa} + s_i + z*\sqrt{(V_{sa} + V_{r\_i})}, i=x,...y \quad (3)$$

Where "$u_i$" represents the upper bound value 208. "a" represents a constant that can be used to allow the bound to cover a potential increase in the mean value of the utilization (e.g., a=1.1 can be used to allow for a potential 10% increase in the utilization). "$m_{sa}$" represents the mean of the adjusted component 238. "$s_i$" represents the series of the seasonal component 226. "z" represents a percentile of the standardized Normal distribution (e.g., z=1.96 for a 95% confidence interval). "$V_{sa}$" represents the variance value 236 of the adjusted component 238. "$V_{r\_i}$" represents the variance value 236 of the residual component 224. "x" represents to a first or initial point in a range of time 214 and "y" represents a second or end point in a range of time 214 (e.g., i=1, ... 24 for a 24 hour range of time). In embodiments, if multiplicative seasonality was used in determining the variance values 236, the device 202 can determine the upper bound value 208 for the processing load 210 using the following equation:

$$u_i = a*m_{sa} + s_i + z*\sqrt{(s_i^2*V_{sa} + V_{r\_i})}, i=x,...y \quad (4)$$

Where "$u_i$" represents the upper bound value 208. "$a_i$" represents a constant that can be used to allow the bound to cover a potential increase in the mean value of the utilization (e.g., a=1.1 can be used to allow for a potential 10% increase in the utilization). "$m_{sa}$" represents the mean of the adjusted component 238. "$s_i$" represents the series of the seasonal component 226. "z" represents a percentile of the standardized Normal distribution (e.g., z=1.96 for a 95% confidence interval). "$V_{sa}$" represents the variance value 236 of the adjusted component 238. "$V_{r\_i}$" represents the variance value 236 of the residual component 224. "x" represents a first or initial point in a range of time 214 and "y" represents a second or end point in a range of time 214 (e.g., i=1, ... 24 for a 24 hour range of time).

The device 202 can determine the upper bound value 208 on a continuous or ongoing manner such that the device 202 keeps determining new upper bound values 208 for a plurality of time points in a range of time 214 or in a rolling window 220. For example, device 202, responsive to determining an initial upper bound value 208 for the processing load 210 at a first time point in a range of time 214 can continue to determine upper bound values 208 for subsequent time periods (e.g., time intervals) within the range of time 214 or within a rolling window 220. In one embodiment, the device 202 can determine the upper bound value 208 for the processing load 210 of a server 260 for a rolling window of 24 hours. The device 202 can store the upper bound values 208 for a server 260 to a memory (e.g., storage device 206) of the device 202.

Referring now to operation (316), and in some embodiments, a threshold can be selected. The device 202 can determine a threshold 216 to monitor and/or assess the processing load 210 of a server 260. The threshold 216 can vary and can be selected based in part on a time period (e.g., time of day, time of year) and/or the server 260 to be monitored. In embodiments, two or more servers 260 can have the same threshold 216. In embodiments, two or more servers 260 can have different thresholds 216. The threshold 216 for a server 260 can be selected to be a portion or percentage of the processing load 210 of the server 260. The portion or percentage can vary and can be selected based in part on a time period (e.g., time of day, time of year) and/or the server 260 to be monitored. In one embodiment, the threshold 216 can be set at 80% of a processing load 210 of a server 260 such that if the upper bound value 208 is greater than or exceeds 80% of the processing load 210 of the server 260, the upper bound value 208 can be greater than or exceed the respective threshold 216 for the server 260.

Referring now to operation (318), and in some embodiments, a server can be monitored. The device 202 can monitor, using the value 208, the processing load 210 of the server 260 over a determined range of time 214, second range of time 214 or rolling window 220. The device 202 can monitor the processing load 210 of the server 260 using the upper bound value 208 on a determined range of time 214 or for a rolling window 220, for example, on a continuous basis. The device 202 can use the upper bound value 208 to monitor the processing load 210 (e.g., CPU utilization) of the server 260 to detect an overload condition or predict performance issues of the server 260.

Referring now to operation (320), and in some embodiments, a determination can be made if the upper bound value is greater than the threshold. The device 202 can determine whether the value 208 of the processing load 210 is greater than a threshold 216 during a range of time 214, the second range of time 214 or a rolling window 220. For example, the device 202 can determine if the upper bound value 208 is greater than or less than the threshold 216 of the processing load at one or more points in a range of time 214 or rolling window 220. In embodiments, the device 202 can compare the upper bound value 208 at individual time points or time intervals and determine if the upper bound value 208 is greater than or less than the threshold 216 of the processing load at the respective time point or time interval (e.g., 1 hour intervals, 30 minute intervals). If the upper bound value 208 is less than the threshold 216, the method 300 can return to (318) to continue monitoring the processing load 210 of the server 260 and determine if the upper bound value 208 is greater than or less than the threshold 216 of the processing load at the one or more subsequent or future time points or time intervals. If the upper bound value 208 is greater than the threshold 216, the method 300 can move to (322) to determine if a performance change has occurred and/or a reason for the increase in the processing load 210 of the server 260.

Referring now to operation (322), and in some embodiments, a performance change can be identified. The device 202 can determine a degradation in a performance of the server 260 responsive to the value 208 of the processing load 210 being greater than the threshold 216 at one or more points during the second range of time 214 or over a rolling window 220. The device 202 can determine if the overload condition resulted in a degradation or change in performance of the server 260 or can predict if the overload condition can result in a degradation or change in performance of the server 260 during a rolling window 220. The overload condition can cause or result in an imbalance, performance issues and/or reduced response times for sessions 254 to the respective server 260.

The degradation or change in performance of the server 260 can include a reduced response time and/or failure of one or more sessions 254 to the server 260. In embodiments, the device 202 can determine the response times of the server 260 to one or more requests or interactions with one or more client devices 250 during one or more sessions 254. The device 202 can determine if the response times have been reduced at the time point or over the time interval of the overload condition. In embodiments, the device 202 can determine if the response times are trending down or reducing over time such that the one or more sessions 254 to the server 260 may experience a degradation or change in performance of the server 260 at one or more subsequent or future time points during the respective sessions 254. In some embodiments, the device 202 identify or determine a cause of the overload condition. For example, the device can determine if a resource, session 254 or application executing on the server 260 is causing the overload condition. The device can determine if a resource, session 254 or application executing on the server 260 is using more CPU utilization that the respective component typically does or has been previously allocated.

Referring now to operation (324), and in some embodiments, an alert can be generated. The device 202 can generate an alert 218 for the device 202 and/or for a client device 250 responsive to a comparison of the value 208 of the processing load 210 to the threshold 216. The device 202 can compare the upper bound value 208 of the processing load 210 to the threshold 216 and generate alerts 218 if the upper bound value 208 is greater than the threshold 216 during one or more points in a range of time 214 or rolling window 220 (e.g., monitoring time period). In embodiments, the device 202 can provide an automated tool to generate alerts 218 or notifications when the level of the processing load 210 (e.g., CPU utilization) in a server 260 reaches or exceeds the respective threshold 216.

In embodiments, the device 202 can generate the alert 218 for the device 202 and/or client device 250 responsive to the value 208 of the processing load 210 being greater than the threshold 216 at one or more points during the second range of time 214 or over a rolling window 220. The alert 218 can include a notification indicating one or more of: an overload condition for a server 260, a degradation in performance of the server 260, a cause for the increase in processing load 210, a time of day of the event and/or a number of sessions 254 active on the server 260. The device 202 can generate an alert to identify a resource, session 254 or application executing on the server 260 and causing the overload condition. In some embodiments, the device 202 can provide the alert 218 through a window or menu of a user interface of the device 202 or one or more client devices 250 to notify a user of the device 202 or one or more client devices 250 of the overload condition.

Referring now to operation (326), and in some embodiments, a determination to reallocate resource can be made. The device 202 can determine to reallocate resources, for example, in a computing environment 200, in response to determining one or more servers 260 are overload or experiencing a degradation in performance. The device 202 can determine that upper bound value 208 for the processing load 210 of one or more servers 260 is greater than the respective thresholds 216 and determine to reallocate resources in the computing environment 200 or among the respective servers 260.

The device 202 can manage the resource allocation among a plurality of servers 260 using the upper bound values 208, processing loads 210 and thresholds 216 of the respective servers 260. The device 202 can generate instructions to forward requests for future or subsequent sessions 254 from a client device 250 to a server 260 to servers having a processing load 210 less than the respective upper bound value 208 of the server 260. The device 202 can generate instructions to deny or prevent requests for future or subsequent sessions 254 from a client device 250 to a server 260 to servers having a processing load 210 greater than the respective upper bound value 208 of the server 260. In some embodiments, the device 202 can provide instructions to one or more servers 260 to not accept sessions 254 until the processing load 210 is less than the respective upper bound value 208 of the server 260. In embodiments, the device can end or stop a resource, session 254 or application executing on the server 260 and causing the overload condition to reduce processing load 210 of the server 260 such that the processing load 210 is less than the upper bound value 208 of the respective server 260. The device 202 can continue to monitor the upper bound values 208 and manage the resource allocation among the plurality of servers 260 using the upper bound values 208, processing loads 210 and thresholds 216 of the respective servers 260.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method comprising:
    determining, by a device, an upper bound of a processing load of a server using data points detected for the processing load over a first range of time, the upper bound determined based on a probability that the data points detected over the first range of time is less than or equal to the upper bound such that less than a total number of the data points over the first range of time are less than or equal to the upper bound;
    determining, by the device, whether a value of a plurality of values of the upper bound of the processing load is greater than a threshold for processor utilization; and
    generating, by the device, an alert responsive to a comparison of the value of the plurality of values of the upper bound of the processing load with the threshold for processor utilization.

2. The method of claim 1, comprising:
    generating, by the device, the alert responsive to the value of the plurality of values of the upper bound of the processing load being greater than the threshold at one or more points during the first range of time.

3. The method of claim 1, comprising:
    detecting, by the device, a degradation in a performance of the server responsive to the value of the plurality of values of the upper bound of the processing load being greater than the threshold at one or more points during the first range of time.

4. The method of claim 1, comprising:
    continuously determining, by the device, the value of the plurality of values of the upper bound of the processing load using a plurality of central processing unit (CPU) utilization loads for the server over a rolling window including the first range of time and a second range of time subsequent to the first range of time.

5. The method of claim 1, comprising:
    determining, by the device, a level component of the processing load and a residual component of the processing load.

6. The method of claim 1, comprising:
    applying, by the device, a filter to the processing load of the server to generate a moving average for the processing load; and
    sampling, by the device using a determined window, the moving average of the processing load to generate a level component for the processing load, the determined window indicative of a plurality of portions of the first range of time.

7. The method of claim 1, comprising:
    subtracting, by the device, a moving average of the processing load from a signal indicative of the processing load to generate a residual component of the processing load, the signal indicative of original data points for the processing load of the server for the first range of time.

8. The method of claim 1, comprising:
    applying, by the device, a decomposition function to a level component of the processing load to generate a seasonal component for the processing load.

9. The method of claim 1, comprising:
    determining, by the device, a variance of a residual component of the processing load.

10. The method of claim 1, comprising:
    determining, by the device, the value of the plurality of values of the upper bound of the processing load of the server using a mean of an adjusted component of the processing load, a variance of the adjusted component of the processing load, a seasonal component of the processing load and a variance of a residual component of the processing load.

11. A system comprising:
    one or more processors coupled to memory, the one or more processors configured to:
    determine an upper bound of a processing load of a server using data points detected for the processing load over a first range of time, the upper bound determined based on a probability that the data points detected over the first range of time is less than or equal to the upper bound such that less than a total number of the data points over the first range of time are less than or equal to the upper bound;

determine whether a value of a plurality of values of the upper bound of the processing load is greater than a threshold for processor utilization; and generate an alert responsive to a comparison of the value of the plurality of values of the upper bound of the processing load with the threshold for processor utilization.

12. The system of claim 11, wherein the one or more processors are configured to:

generate the alert responsive to the value of the plurality of values of the upper bound of the processing load being greater than the threshold at one or more points during the first range of time.

13. The system of claim 11, wherein the one or more processors are configured to:

detect a degradation in a performance of the server responsive to the value of the plurality of values of the upper bound of the processing load being greater than the threshold at one or more points during the first range of time.

14. The system of claim 11, wherein the one or more processors are configured to:

continuously determine the value of the plurality of values of the upper bound of the processing load using a plurality of central processing unit (CPU) utilization loads for the server over a rolling window including the first range of time and a second range of time subsequent to the first range of time.

15. The system of claim 11, wherein the one or more processors are configured to:

determine a level component of the processing load and a residual component of the processing load.

16. The system of claim 11, wherein the one or more processors are configured to:

apply a filter to the processing load of the server to generate a moving average for the processing load; and sample, using a determined window, the moving average of the processing load to generate a level component for the processing load, the determined window indicative of a plurality of portions of the first range of time.

17. The system of claim 11, wherein the one or more processors are configured to:

subtract a moving average of the processing load from a signal indicative of the processing load to generate a residual component of the processing load, the signal indicative of original data points for the processing load of the server for the first range of time.

18. The system of claim 11, wherein the one or more processors are configured to:

determine the value of the plurality of values of the upper bound of the processing load of the server using a mean of an adjusted component of the processing load, a variance of the adjusted component of the processing load, a seasonal component of the processing load and a variance of a residual component of the processing load.

19. A non-transitory computer-readable medium, comprising instructions that, when executed by the processor of a device, cause the processor to:

determine an upper bound of a processing load using data points detected for the processing load over a first range of time, the upper bound determined based on a probability that the data points detected over the first range of time is less than or equal to the upper bound such that less than a total number of the data points over the first range of time are less than or equal to the upper bound;

determine whether a value of a plurality of values of the upper bound of the processing load is greater than a threshold for processor utilization; and generate an alert responsive to a comparison of the value of the plurality of values of the upper bound of the processing load to the threshold for processor utilization.

20. The computer-readable medium of claim 19, further comprising instructions that cause the processor to:

generate the alert responsive to the value of the plurality of values of the upper bound of the processing load being greater than the threshold at one or more points during the first range of time; and detect a degradation in a performance responsive to the alert.

* * * * *